United States Patent [19]
Obenhaus

[11] 3,803,419
[45] Apr. 9, 1974

[54] OPTICALLY COUPLED THRESHOLD MONITORING SYSTEM

[75] Inventor: Robert E. Obenhaus, South Easton, Mass.

[73] Assignee: Texas Instruments Incorporated, Dallas, Tex.

[22] Filed: May 1, 1972

[21] Appl. No.: 249,022

[52] U.S. Cl............................. 250/551, 250/217 SS
[51] Int. Cl........................... G02f 1/28, H01j 39/12
[58] Field of Search.................. 250/217 SS, 217 SI; 307/290, 311, 203, 235

[56] References Cited
UNITED STATES PATENTS

| | | | |
|---|---|---|---|
| 3,641,564 | 2/1972 | Fassett............................ | 250/217 SS |
| 2,838,719 | 6/1958 | Chitty............................. | 250/217 SS |
| 3,315,176 | 4/1967 | Biard.............................. | 250/217 S |
| 3,412,264 | 11/1968 | Preston............................ | 307/290 |
| 3,410,961 | 11/1968 | Slana.............................. | 307/311 |
| 3,708,672 | 1/1973 | Marinkovic....................... | 250/217 S |
| 3,401,266 | 9/1968 | Cooke-Yarborough............... | 250/217 R |

OTHER PUBLICATIONS

"Look At What Optical Semiconductors Do Now" by Wolff, Electronics, June 28, 1963, Page 32, Vol. 36, No. 26

*Primary Examiner*—Harold A. Dixon

[57] ABSTRACT

A threshold monitoring system monitors a parameter, such as pressure, temperature, and the like, and provides an analog electrical signal whenever a preadjusted threshold level of the parameter is violated. This analog electrical signal is input to an optically coupled isolator having a logic signal output which is coupled to a digital system, such as a digital computer. A preferred optically coupled isolator comprises a light emitting diode optically coupled to a photo transistor.

3 Claims, 1 Drawing Figure

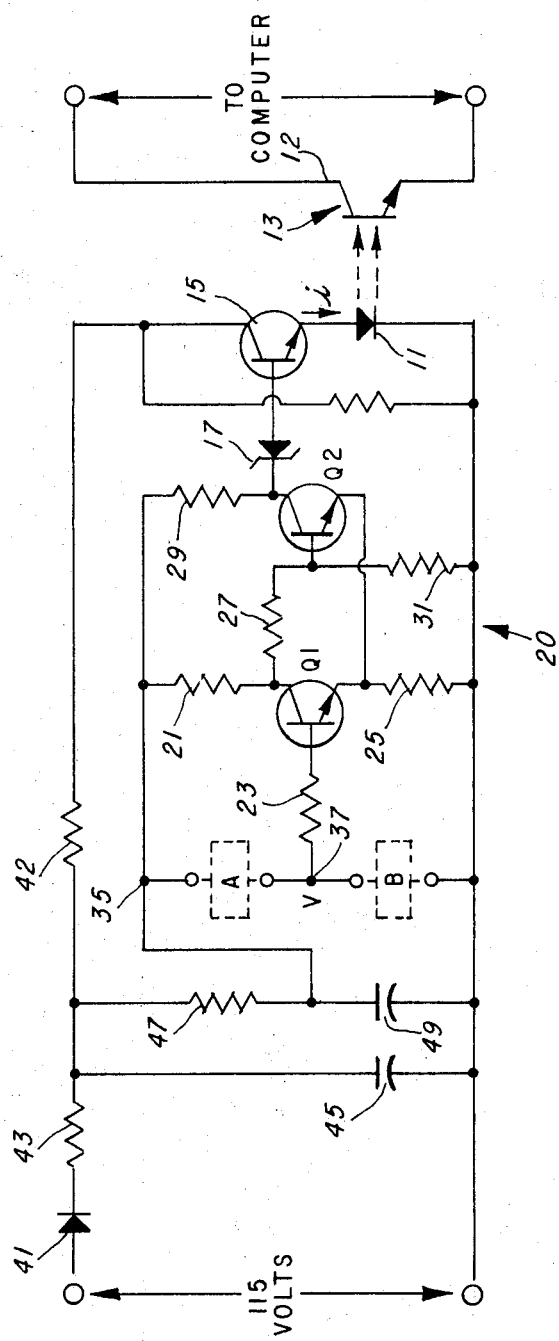

OPTICALLY COUPLED THRESHOLD MONITORING SYSTEM

This invention is related to the subject of co-pending application Ser. No. 249,021, entitled Computer Input/Output Interface Systems Using Optically Coupled Isolators, filed concurrently herewith, by the same inventor and assigned to the assignee of this invention.

This invention relates generally to monitoring and control systems, and more particularly to a threshold monitoring system capable of direct interface with a digital computer.

In process control applications it is frequently desirable to monitor physical parameters, such as pressure, temperature and the like, to enable control of the process by means of a control system, such as a programmed digital computer. Most devices which measure physical parameters, such as thermistors, pressure gauges and the like, are analog devices, requiring that the output signal thereof be converted from analog to digital form to interface with the digital computer. A common problem in interfacing such monitoring devices results from spurious signals being present in the monitor electrical output signal, which may result in false signals to the computer. It is thus desirable to provide electrical isolation between the monitoring device and the digital computer, as well as to provide a simple, economical analog to digital converter for interfacing analog monitoring devices with a digital computer.

It has been recognized that optical techniques may be utilized to provide electrical isolation in computer I/O interface systems. Conventional optical interface systems employ incandescent or neon lamps which produce light energy when a current is passed therethrough. However, these lamps are subject to deterioration and cannot be depended upon for long term reliability. Additionally, incandescent lamps in particular are slow in response due to the inherent thermal inertia of the tungsten filaments. Existing systems which employ incandescent lamps may require several electrical cycles, even at a 60 cycle frequency, to extinguish after the cutoff signal is made. This presents a substantial problem in high speed control systems wherein several rapid sequential operations are required.

In general existing systems for interfacing analog monitoring or sensing devices with digital computers suffer from one or more of various defects including slow speed, large space utilization, high power consumption, inflexability of utilization, difficulty in maintenance and unreliability.

Accordingly, the present invention includes a sensing device for sensing a parameter and a network means for providing an electrical indication that a threshold value of the parameter has been violated. This electrical signal is coupled to drive a radiation emissive semiconductor device which is optically coupled to a radiation sensitive semiconductor device. The radiation sensitive semiconductor device is operated in the saturation mode such that a constant logic level voltage is available at the output thereof when radiation is being received, which will only be when the threshold level of the parameter has been violated. The invention features the ability to interface directly with either low level, (for example, 3 to 5 volts) or high level (for example, around 20 volts) logic systems without circuit modification. Electrical isolation is provided between the parameter sensing device and the input to the digital computer. Additional features of the system include high speed, low space utilization, low power consumption, wide flexibility of utilization, ease in maintenance and high reliability.

The present invention, as well as further objects and advantages thereof, may be more fully understood from the following detailed description of a preferred embodiment in conjunction with the drawing, in which:

The FIGURE is a schematic diagram of a preferred threshold monitoring system.

Referring now to the drawing, the FIGURE schematically illustrates a preferred embodiment of the threshold monitoring system of this invention. The invention includes a sensing device for monitoring a parameter and providing an electrical signal according to the value of the parameter measured. A Schmitt Trigger is provided to produce a logic level output whenever a threshold condition of the sensing device signal is violated. The output of the Schmitt Trigger is used to switch on a light emitting diode which is coupled to a photo transistor. The collector of the photo transistor provides a logic signal indication that the threshold level of the parameter has been violated.

The light emitting diode (LED) 11 is optically coupled to the photo transistor 13 such that when a current $i$ passes through the LED 11 radiation is emitted and is received at the base terminal of the photo transistor 13. The photo transistor 13 is matched to the LED 11 such that a relatively low level of radiation from LED 11 will saturate photo transistor 13, such that a constant D.C. potential is available at the collector 12 of photo transistor 13 when the photo transistor is turned on by the radiation. The photo transistor 13 may drive either high level or low level logic systems by direct connection to the collector 12. Transistor 15 must be biased on by a biasing signal appearing at its base terminal in order to provide current $i$ to cause the LED 11 to radiate.

A conventional 115 volt A.C. signal may be connected to the input of the circuit to supply power for the operation thereof. A 115 volt A.C. signal is input to the diode 41, which in conjunction with resistor 43 and capacitor 45 effectively perform as a D.C. voltage source for supplying power to the monitoring system. The diode 41 half wave rectifies the incoming A.C. signal. Resistor 47 in conjunction with capacitor 49 serves to filter out line transients from the incoming A.C. power signal. If a D.C. power source is available, then diode 41, resistor 43 and capacitor 45 may be omitted and the D.C. source coupled directly to the node adjoining resistors 42 and 47.

A current $i_1$ will be thus caused to flow from the power supply from node 35 through elements A and B to the common reference potential. Any variable resistance sensing device, i.e., device for measuring physical or other parameters which undergoes resistance variation according to the value of the parameter being measured may be inserted in either location A or location B. In this manner changes in the value of the physical parameter vary the resistance of the sensing device and will thus vary the potential V appearing at node 37. Thus the voltage V will be varied according to the value of the parameter being monitored.

Location of the sensing device at position A or position B will be determined according to whether it is desired to establish a minimum or a maximum threshold level, and according to whether the sensing device is a positive or negative coefficient device. For example, if the sensing device is a positive coefficient device, i.e., decreases in the value of the parameter decrease the resistance of the device, and the device is placed at location A, decreases in the parameter will decrease the voltage drop through the device and thus increase the potential appearing at node 37. In this manner a minimum threshold level of the parameter (corresponding to a threshold level of V) may be established by the device at location A. In order to establish a maximum threshold level of the parameter, a positive coefficient device should be located at position B such that increases in the resistance of the device will increase the potential V appearing at node 37. Conversely, if a negative coefficient device is being utilized, the device should be located at position A for establishing a maximum threshold parameter level and at position B to establish a minimum threshold parameter level.

The conventional Schmitt Trigger circuit 20 is coupled to be operative by the threshold voltage V to switch on the transistor 15 to thus enable LED 11 to radiate. Input resistor 23 of the Schmitt Trigger circuit is connected to the node 37 and to the base terminal of a first transistor Q1 of the circuit. Biasing of the transistor Q1 is provided by the resistors 21 and 25. The collector of transistor Q1 is connected through a resistor 27 to the base terminal of transistor Q2, which is further connected to the reference potential by resistor 31. Biasing to transistor Q2 is provided through resistors 29, 25 and 31.

In operation, when the potential at node 37 reaches the threshold level V, (referred to as the trip point of the Schmitt Trigger) transistor Q1 is biased on. When transistor Q1 is on, this biases transistor Q2 off. When transistor Q2 is off, the potential appearing at the collector of Q2 is sufficient to bias transistor 15 on. In this manner, transistor 15 is biased on only when the threshold level voltage V has appeared at node 37. When the potential at node 37 has reduced to less than V, transistor Q1 will be turned off, turning transistor Q2 on and transistor 15 off. However, the circuit parameters of Schmitt Trigger 20 may be adjusted to be responsive to upper and lower trip points, such that transistor Q1 is turned on by V reaching the upper trip point and then remains on until V reduces below the lower trip point. In this manner, once the parameter has violated an initial threshold level, the logic output from photo transistor 13 will remain in the same condition until the parameter has returned to a second threshold level.

The collector of transistor Q2 is coupled to the base terminal of transistor 15 by a Zener diode 17. Diode 17 prevents nuisance operation of transistor 15 resulting from transistor potentials on the collector of transistor Q2 and also renders the circuit more stable by accounting for differences between the Betas of transistors Q2 and 15, such that a more efficient switching action is provided at transistor 15.

Various well known conventional sensing devices may be used according to the nature of the parameter to be sensed. For example, both positive temperature coefficient and negative temperature coefficient thermistors are available for monitoring temperature. In general, any variable resistance sensor may be utilized including resistance type strain gauges, resistance potentiometers, photocells, pressure transducers, and others.

A resistance potentiometer may be provided at either position A or B, whichever is not utilized by the sensor, to facilitate adjustment of the threshold voltage at node 37. The potentiometer may be readily varied to provide any desired voltage at node 37 corresponding to a particular threshold value of the parameter being sensed. Thus the circuit includes a feature of easy adjustability of threshold levels.

Photo transistor 13 is to be operated in a saturated mode such that it remains fully saturated when radiation is being received from the LED 11. This enables a constant D.C. voltage to be available at the collector. The photo transistor 13 is matched to the LED 11 such that a relatively low intensity radiation from the LED 11 will saturate photo transistor 13. Because the LED begins to radiate at a level well below its maximum current capability, the series resistance comprising resistor 43 plus resistor 42 may be selected to restrict operation to the low power region of the LED. This ensures a practically unlimited life while virtually eliminating the possibility of thermal runaway. In contrast with other electro-optic systems, the resulting unit has no incandescent or neop lamp to degrade with time.

Line voltage transient immunity is virtually assured by the circuit of FIG. 1. The capacitor 49 is extremely effective in by-passing line transients around the monitoring circuit. Also, the integrating circuit comprising resistor 47 in conjunction with capacitor 49 assures that the major transient voltage drop occurs across the resistor 47. The LED- photo transistor combination provides a total response speed in the high kilohertz region, thus providing substantial immunity from transients in the megahertz frequency region.

Electrical isolation is provided by, and is a function of, the physical spacing between the LED 11 and photo transistor 13. Approximately a 1,000 volt isolation is adequate for most interfacing situations.

The interface system of this invention is particularly adaptable to interconnection with a digital computer having an individually addressable bit I/O characteristic such as the TI-960 computer manufactured by Texas Instruments Incorporated. The single bit addressing characteristic of the TI-960 is described in continuation patent application Ser. No. 178,804, filed Sept. 8, 1971 by George P. Shuraym and assigned to the assignee of this invention. In summary, the TI-960 has a communication register I/O channel with the capability of directly addressing each bit position within the I/O channel. Thus, interface systems of the type illustrated in FIG. 1 may be connected directly to bit positions within the I/O channel such that the computer may monitor the status of a plurality of external parameters by means of addressing specific bit positions in the communication register. However, the interface circuit may also be utilized in conjunction with general purpose digital computers which are limited in I/O to a word or byte. In such case, conventional software is available for determining the condition of a specific bit within the I/O channel.

The present invention having been described in connection with a preferred embodiment thereof, it is to be understood that the description herein is intended only as illustrative of the principal features of the invention.

What is claimed is:

1. A circuit for interfacing an analog sensing device to an I/O channel of a digital computer comprising:
   a. means for supplying a current signal;
   b. a variable resistance sensing means coupled to receive said current signal and further coupled to be responsive to changes in a parameter to undergo changes in electrical resistance;
   c. an adjustable resistance means connected in series with said sensing means to enable threshold adjustment of said parameter;
   d. a Schmitt trigger coupled to the junction of said sensing means and adjustable resistance means responsive to a predetermined threshold condition of said parameter to provide a control signal;
   e. a Zener diode connected to the output of said Schmitt trigger and a transistor having a first terminal connected to the output of said Zener diode;
   f. a light emitting diode coupled to a second terminal of said transistor to be responsive to said control signal for emitting radiation;
   g. a phototransistor optically coupled to receive said radiation and provide a logic signal output responsive thereto; and
   h. means for connecting said logic signal to said I/O channel.

2. The circuit of claim 1 wherein said logic signal is coupled to a specific individually addressable bit position in said I/O channel.

3. A circuit as in claim 1 wherein said optically coupled diode and transistor operate in a saturation mode for providing a digital output.

* * * * *